(12) United States Patent
Narayanun et al.

(10) Patent No.: US 11,526,644 B2
(45) Date of Patent: Dec. 13, 2022

(54) CONTROLLING TEST NETWORKS OF CHIPS USING INTEGRATED PROCESSORS

(71) Applicant: Nvidia Corporation, Santa Clara, CA (US)

(72) Inventors: Kaushik Narayanun, Santa Clara, CA (US); Mahmut Yilmaz, Santa Clara, CA (US); Shantanu Sarangi, Santa Clara, CA (US); Jae Wu, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 32 days.

(21) Appl. No.: 17/089,864

(22) Filed: Nov. 5, 2020

(65) Prior Publication Data

US 2022/0138387 A1 May 5, 2022

(51) Int. Cl.

| | |
|---|---|
| *G06F 30/333* | (2020.01) |
| *G01R 31/317* | (2006.01) |
| *G01R 31/3185* | (2006.01) |
| *G06F 30/394* | (2020.01) |
| *G06F 30/323* | (2020.01) |
| *G06F 115/12* | (2020.01) |
| *G06F 115/02* | (2020.01) |

(52) U.S. Cl.
CPC ..... *G06F 30/333* (2020.01); *G01R 31/31704* (2013.01); *G01R 31/318583* (2013.01); *G06F 30/394* (2020.01); *G06F 30/323* (2020.01); *G06F 2115/02* (2020.01); *G06F 2115/12* (2020.01)

(58) Field of Classification Search
None
See application file for complete search history.

(56) References Cited

U.S. PATENT DOCUMENTS

| | | | | |
|---|---|---|---|---|
| 6,115,763 | A * | 9/2000 | Douskey | G06F 11/267 710/72 |
| 7,665,002 | B1 * | 2/2010 | White | G01R 31/31705 714/733 |
| 8,813,019 | B1 * | 8/2014 | Rath | G06F 30/33 716/112 |
| 9,043,649 | B2 * | 5/2015 | Menon | G06F 11/267 714/30 |
| 10,162,007 | B2 * | 12/2018 | Chan | G01R 31/31919 |
| 11,079,434 | B2 * | 8/2021 | Kalva | G06Q 10/087 |
| 2021/0333326 | A1 * | 10/2021 | Wang | G01R 31/31926 |

* cited by examiner

*Primary Examiner* — Leigh M Garbowski

(57) ABSTRACT

The disclosure provides using test processors to provide a more flexible solution compared to the existing DFX blocks that are used for controlling test networks in chips. The test processors provide a highly flexible solution since programming of the test processors can be changed at any time; even after manufacturing, and can support practically an unlimited number of core chips in any configuration. The high flexibility provided via the test processors can reduce engineering effort needed in design and verification, accelerate schedules, and may prevent additional tapeouts in case of DFX design bugs. By making debug and diagnosis easier by providing an opportunity to change debug behavior as needed, the time-to-market timeline can be accelerated. Accordingly, the disclosure provides a chip with a test processor, a multi-chip processing system with a test processor, and a method of designing a chip having a test processor.

27 Claims, 13 Drawing Sheets

CONTROLLING TEST NETWORKS OF CHIPS USING INTEGRATED PROCESSORS

TECHNICAL FIELD

This application is directed, in general, to testing chips and, more specifically, to interfacing with the test circuitry integrated in the chips.

BACKGROUND

An integrated circuit (IC) is a collection of electrical components that are connected together in a certain way for a common purpose. ICs are often referred to as "chips" and can be found on the circuit boards of common household devices, such as televisions, computers, garage door openers, and sprinkler controllers. The electrical components of an IC, such as transistors, resistors, capacitors, etc., are connected together to perform the common purpose according to several design steps.

Manufacturers test chips before shipping to determine if the chips are functioning properly and if there are manufacturing defects, such as structural faults. Design-for-test (DFT) technologies are often used to check for manufacturing defects and ensure devices have been correctly fabricated. As more chips are used in products tasked with handling safety critical operations (e.g., autonomous driving), testing chips during the lifetime of the final product can also be used to enhance the overall safety and reliability of the chips and the products in which they operate. For performing the various tests, test circuitry integrated in the chips is typically used.

For example, some existing solutions for structural test, diagnosis, and system debug of chips rely on application specific, custom hardware logic blocks, collectively referred to as Design-for-X (DFX) blocks. The plan of record (POR) and design specifications for DFX blocks are based on the overall chip specifications, and are determined at the early stages of a design flow for a chip. Subsequently, DFX blocks are regularly updated during the design cycle, along with the chip in which the DFX blocks are integrated.

SUMMARY

One aspect provides a chip. In one example, the chip includes: (1) a chiplet including at least one test network, and (2) a test processor connected to and configured to control the at least one test network for testing of the chiplet.

In another aspect, a multi-chip processing system is disclosed. In one example the multi-chip processing system includes: (1) a first chip including a first chiplet having at least one test network, a first connection fabric, and a first processor configured to control the at least one test network for testing of the first chiplet, wherein the first processor is connected to the at least one test network via the first connection fabric, and (2) a second chip including a second chiplet having at least one testing network, a second connection fabric, and a second processor configured to control the at least one testing network for testing of the second chiplet, wherein the second processor is connected to the at least one testing network via the second connection fabric, and the first and second chips are connected via the first and second connection fabrics.

In yet another aspect, the disclosure provides a method of designing a chip. In one example, the method includes: (1) receiving a system level design for the chip, (2) converting the system level design to a register transfer level description and inserting a register transfer level description of test networks and at least one test processor for controlling the test networks, and (3) creating a physical design for the chip employing the register transfer level description that includes the test networks and the at least one test processor.

In still another aspect, the disclosure provides a GPU chip. In one example, the GPU chip includes: (1) a plurality of chiplets, wherein one or more of the plurality of chiplets includes at least one test network and two or more of the plurality of chiplets are configured to perform graphics computations, and (2) a hierarchy of test processors connected to and configured to control the at least one test networks for testing of the plurality of chiplets In still yet another aspect, the disclosure provides a SoC. In one example, the SoC includes: (1) at least one graphics processing unit (GPU) chip including a first plurality of chiplets that each have at least one test networks, a first connection fabric, and a first processor configured to control each of the at least one test networks for testing a respective one of the first plurality of chiplets, wherein the first processor is connected to each of the at least one test networks via the first connection fabric, and (2) at least one central processing unit (CPU) chip including a second plurality of chiplets that each have at least one testing network, a second connection fabric, and a second processor configured to control each of the at least one testing networks for testing a respective one of the second plurality of chiplets, wherein the second processor is connected to each of the at least one testing networks via the second connection fabric.

BRIEF DESCRIPTION

Reference is now made to the following descriptions taken in conjunction with the accompanying drawings, in which.

DETAILED DESCRIPTION

When new chips are designed, DFX blocks are opened and re-designed to adapt to the new chip. Even small changes to a chip design can require a significant amount of methodology, register transfer level (RTL) coding, and verification effort to adapt DFX blocks. Due to the custom-design nature, DFX blocks are not flexible. As such, late design changes or bug fixes can cause excessive engineering effort and schedule delays to the design flow of a chip. Additionally, if any bugs are found after tapeout, there are usually no easy fixes. Instead, another tapeout or metal fixes may be required. Similarly, adding new features or updating existing features to DFX blocks after tapeout, or even at the late stages of the design flow, are difficult if not impossible.

The disclosure provides chips that use processors for interfacing and controlling the test circuitry integrated in the chips. Thus, instead of inflexible, hardware-based DFX blocks, test processors are positioned in chips and programmed to control the test circuitry, or test networks, integrated in the chips. One or more test processor can be employed for controlling one or more test network located in a chip. The number of test processors employed can depend on, for example, the complexity of the chip, the number of test networks to control, and the complexity needed to control the test networks. In some examples, a test processor can cooperate with a custom hardware controller for controlling a test network, also referred to as a testing network. The test processors can be hierarchically ordered, such that a higher ordered test processor communicates test data and configuration data to lower ordered test processors for interfacing with test networks. With multiple chips connected together, the test processors on the multiple chips can also be hierarchically ordered. A test processor can be a general-purpose central processing unit (CPU), such as a microprocessor.

Figure 1:
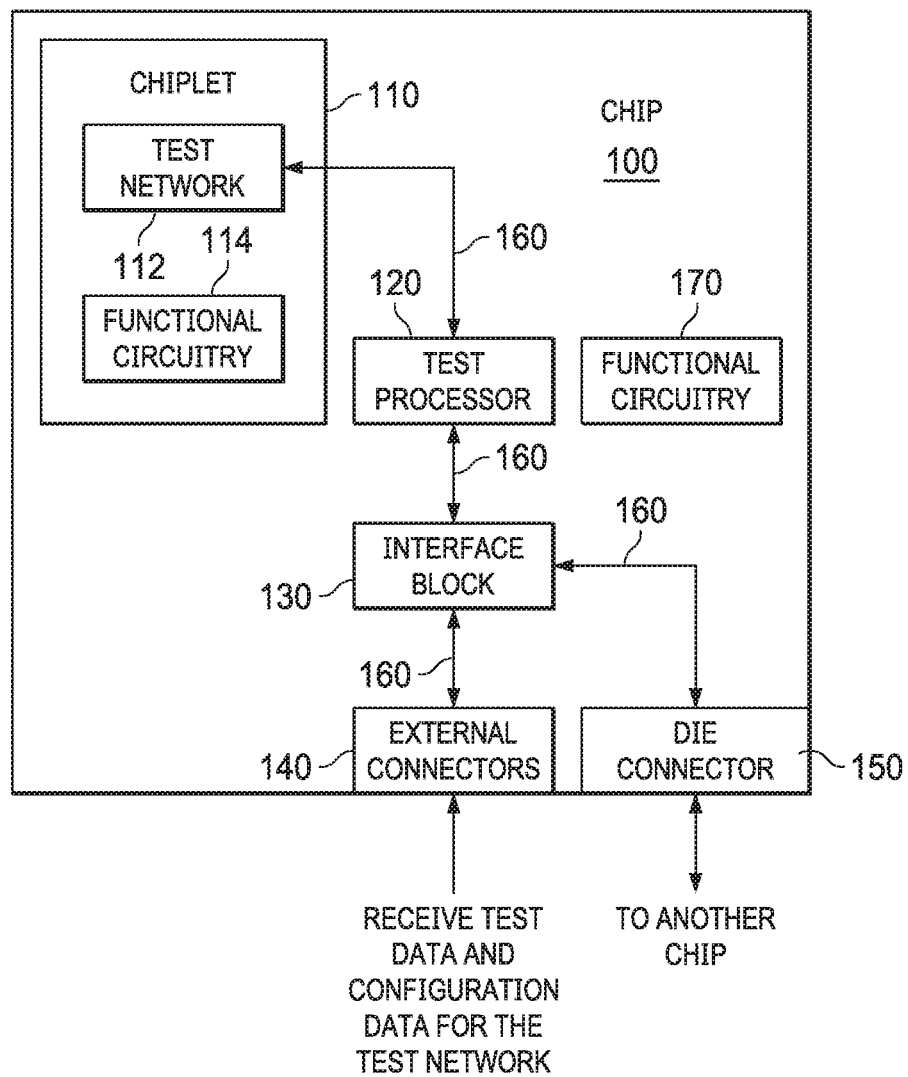
FIG. 1 illustrates a block diagram of an example of a chip constructed according to the principles of the disclosure.

FIG. 1 illustrates a block diagram of an example of a chip 100 constructed according to the principles of the disclosure. The chip 100 includes a chiplet 110 having a test network 112, and a test processor 120, connected to the test network 112, that is configured to control the test network 112 for testing of the chiplet 110. The chiplet 110 is a module or block having functional circuitry 114 that is configured, (i.e., designed, constructed, and/or programmed) to perform a task or function. For example, the chip 100 can be a graphic processing unit (GPU) and the functional circuitry 114 can be tasked to perform a function for the GPU, such as, perform graphics computations, store data, or control I/O interfacing. As illustrated in other figures, a chip can have more than one chiplet. For example, a chip can be a GPU with multiple chiplets that are each configured to perform graphic computations in parallel. Instead of a GPU, the chip 100 can also be another type of integrated circuit or processor, such as a central processing unit (CPU). The chip 100 can also include functional circuitry 170 that is configured to perform a task for the chip 100. The functional circuitry 170 can be at a higher hierarchy level of the chip 100 than the functional circuitry 114 of the chiplet 110. The test network 112 can be used to test the functional circuitry 114. As also illustrated in additional figures, a chiplet can have more than one test network.

The test network 112 can be a scan network, a Logic Built-in self-test (LBIST) network, a Memory Built-in self-test (MBIST) network, a JTAG, or another test circuit integrated in the chiplet 110. The test network 112 can be used for structural tests, diagnosis tests, and system debug testing for the chiplet 110. The test network 112 can also be used for configuring a test circuit, silicon characterization of the chiplet 110, and for configuring the functional logic of the chiplet 110. Test data and configuration data for the test network 112 is received via an interface block 130 and external connectors 140. The test data is the data applied to test networks for particular tests, such as test patterns, and the configuration data is connection or interface information for delivering the test data to the different test networks, such as test network 112. The configuration data can also include set-up information for the chip 100 for a specific test. For example, MBIST requires a chip to be configured in a specific way to run MBIST.

The interface block 130 is configured to receive and provide test data and configuration data to the test processor 120 for controlling the test network 112 for testing the chiplet 110. The external connectors 140 are ports, pins, or connectors that are configured for external communications, which includes receiving the test data and configuration data from an external source, and configured to provide the test data and configuration data to the interface block 130. The external connectors 140 can include one of more of a high speed link interconnect, a memory pin(s), a test pin(s), or a JTAG connector. The chip 100 also includes a die connector 150 that is configured to connect the chip 100 to another chip. The die connector 150 can be a connector for connecting to a micro bump, a through-silicon via (TSV), a ball grid array (BGA), an interposer, or another type of chip-to-chip connector. The die connector 150 is connected to the interface block 130 via a connection fabric 160. The interface block 130 includes the necessary hardware, software, or combination thereof to communicate, or transfer, data between the different types of external connectors 140 and the test processor 120. As such, the interface block 130 is configured to interface with the external connectors 140 and convert received data to the format, or protocol, required by the test processor 120, and convert data from the test processor 120 to the required format of the external connectors 140.

The interface block 130, test processor 120, and test network 112 are communicatively coupled together via the connection fabric 160. In some examples, such as in FIGS. 2A-2B, the connection fabric 160 includes one or more routers. A connection fabric router is configured to connect test processors and other fabric routers to each other via the connection fabric 160 for distributing data. The connection fabric 160 can be metallic connectors typically employed to transfer data in chips. The connection fabric 160 can be a high speed link or interface having, for example, communication capability of a high speed link.

Figure 2A:
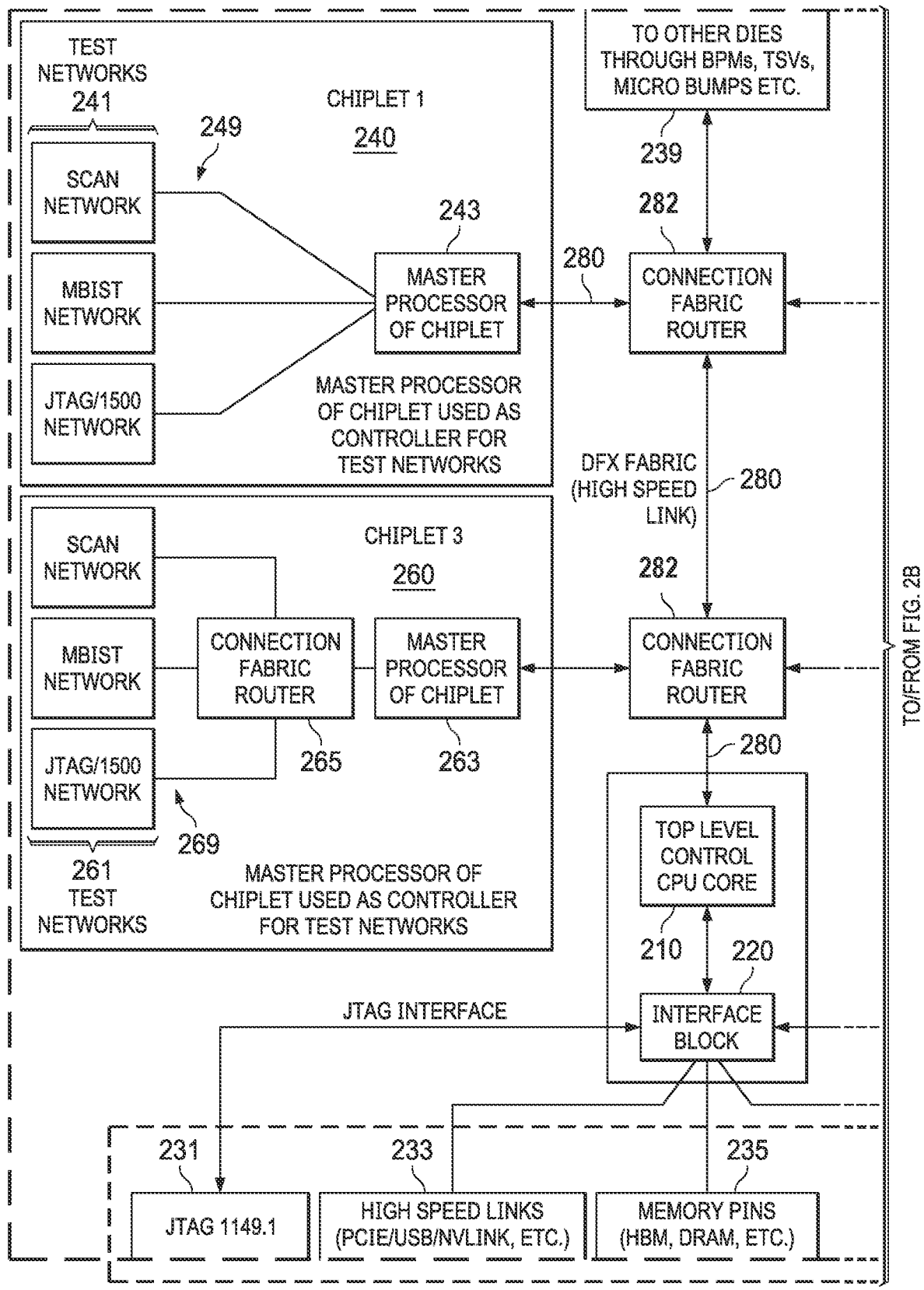
FIGS. 2A and 2B illustrate a diagram of another example of a chip constructed according to the principles of the disclosure.
Figure 2B:
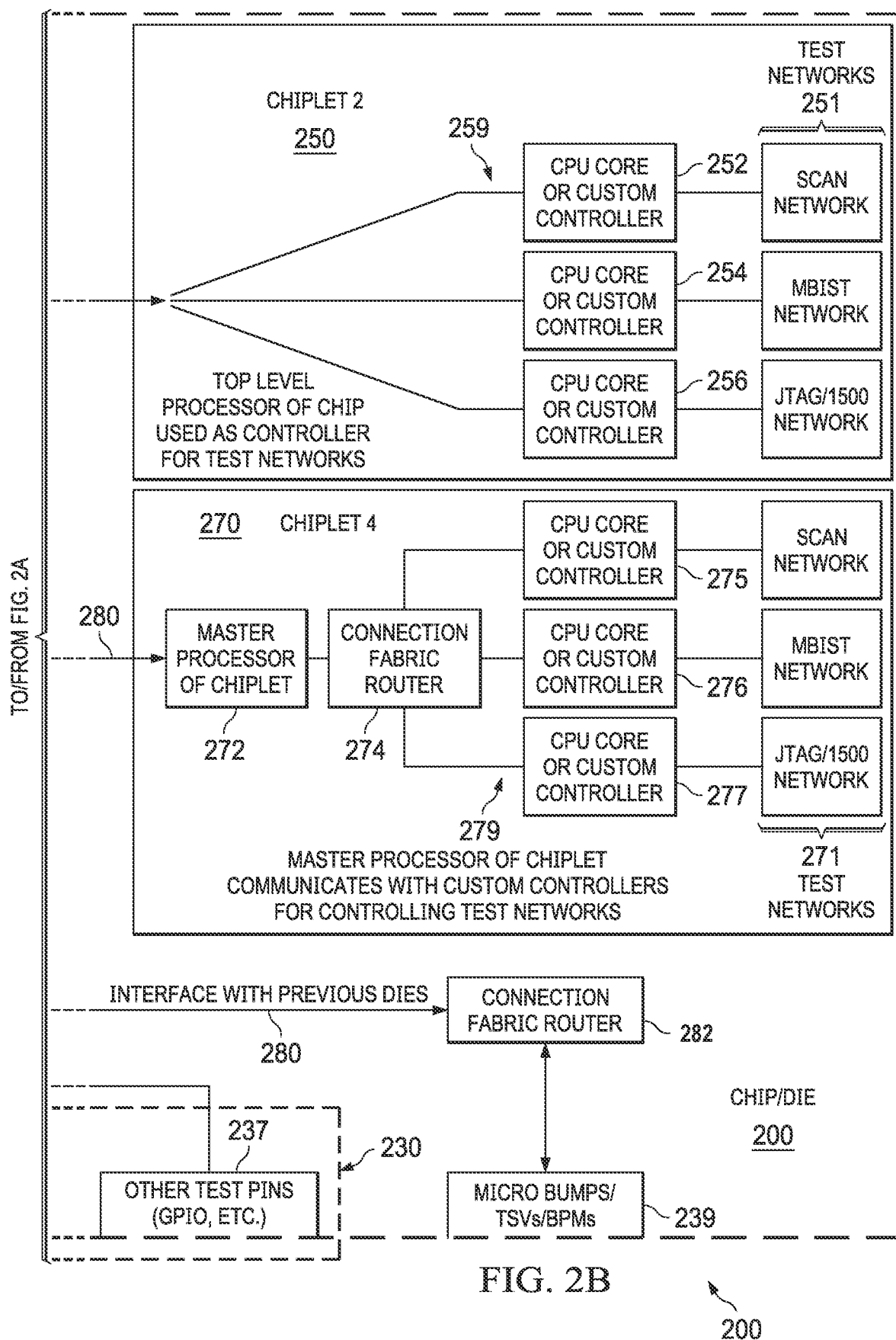

FIGS. 2A and 2B illustrate a diagram of another example of a chip 200 constructed according to the principles of the disclosure. The chip 200 can be a GPU, a CPU, or another type of processor or IC. The chip 200 includes a top level processor 210, an interface block 220, external connectors 230, die connectors 239, and multiple chiplets 1-4 that are individually identified as chiplet 240, chiplet 250, chiplet 260, and chiplet 270, and collectively referred to as the chiplets 240-270. As with chiplet 110, each of the chiplets 240-270 include functional circuitry configured to perform a function for the chip 200. Additionally, as with chip 100 the chip 200 can include additional functional circuitry. For visual clarity, the functional logic of the chiplets 240-270 and the chip 200 are not illustrated in FIG. 2A and FIG. 2B.

The top level processor 210 communicates to components external to the chip 200 through the interface block 220 and directs the delivery of the test data and configuration data to each of the chiplets 240-270. The interface block 220 is connected to the top level processor 210 and the external connectors 230 for communicating data there between. The external connectors 230 are configured to provide different interfaces for connections external to the chip 200. The external connectors 230 include JTAG pins 231, high-speed links 233, memory pins 235, and input/output (IO) connectors 237. The JTAG pins 231 can be 1149.1 compliant JTAG pins and the high-speed links 233 can be Peripheral Component Interconnect Express (PCIE) connections, a type of USB connection, or, for example, another type of serial high speed link. The high-speed links 233 can be an NVLink from Nvidia Corporation of Santa Clara, Calif. The memory pins 235 can be conventional memory pins and the IO connectors 237 can be general purpose test pins for inputs and output. The memory pins 235, for example, can be high bandwidth memory pins (HBM) or dynamic random-access memory (DRAM) pins. The die connectors 239 are configured for connecting to another chip or chips and can be one or more of a through-silicon via (TSV), a BPM, or a micro-bump, or other type of chip-to-chip connector.

In addition to the top level processor 210, chip 200 can include one or more additional test processors that can be located, for example, in one or more of the chiplets 240-270. The test processors can be the same CPU cores, wherein RAM size can vary depending on the tasks each processor is configured to control. Connection fabric 280 and connection fabric routers 282 can hierarchically connect each of the test processors together. At each major hierarchy level (e.g., chiplet level), there can be local master test processors that directly talk to connection fabric 280. The master test processors further control lower level processor cores (if present) that are dedicated to individual testing tasks. For instance, there can be a processor for MBIST, another one for scan test/debug/diagnosis, and another one for JTAG/1500 network. Non-overlapping tasks can be grouped under a single test processor if the complexity overhead is low. At the chiplet level, instead of test processors, custom controllers can also be used if they provide enough flexibility with higher efficiency. Custom controllers can directly interface with the connection fabric 280 without another test processor in between. Instructions for the test processors can be updated at any time, before or after tapeout, to accommodate new features and to fix bugs.

Basic initialization of the test processors is done during reset of the chip 200 through boot ROMs. After reset, the top level processor 210 can be further configured through one of the external connectors 230, such as the JTAG interface 231. Once fully configured, instructions for the top level processor 210 are loaded through the interface block 220. The top level processor 210 can configure other lower level test processors and load their instructions through the connection fabric 280. Various examples of test processors and custom controller are represented in the chiplets 240-270 and are discussed below.

Each of the chiplets 240-270 represent different examples of employing test processors to control test networks of chiplets. Each of the chiplets 240-270 include test networks denoted by element numbers 241, 251, 261, and 271, respectively. Each of the test networks 241, 251, 261, and 271, include three different types of test networks: a scan network, a MBIST network, and a JTAG/1500 network. In other examples, the number and type of test networks for a chiplet or chiplets of a chip can vary. The components of chiplets 240, 250, 260, 270, are connected as shown via connectors that are denoted as connectors 249, 259, 269, and 279. The connectors 249, 259, 269, 279, can be conventional connections employed in integrated circuits.

In chiplet 240, a master processor 243 of the chiplet 240 is used to control the test networks 241 without employing a custom controller for a test network of the test networks 241. In this example, the master processor 243 also delivers the test and configuration data to each different test network of test networks 241 without a router. Instead, each network of the test networks 241 is connected directly to the master processor 243.

Chiplet 250 does not have a master processor but does have controllers 252, 254, 256, for each network of the test network 251. The controllers 252, 254, 256, can be custom hardware controllers or can be processors that are specifically configured as custom controllers for a network of the test networks 251. In this example the top level processor 210 delivers the test and configuration data to the controllers 252, 254, 256, for individually controlling the test networks 251. For chiplet 250, the connectors 259 provide a direct link to the connection fabric 280.

In some examples, one or more controllers can be used with a master processor in a chiplet. For example, chiplet 250 could have a master processor for controlling the MBIST and JTAG/1500 networks of the test networks 251 and have a single controller, controller 251, for controlling the scan network of the test networks 251.

Chiplet 260 includes a master processor 263 that delivers the test and configuration data to the test networks 261 via a connection fabric router 265. Like chiplet 240, chiplet 260 does not have a custom controller for each network of the test networks 261. Instead, the master processor 263 is the controller for each network of the test network 261 and communicates with each network via the connection fabric router 265 and the connectors 269.

Chiplet 270 includes a master processor 272, a connection fabric router 274, and individual controllers 275, 276, 277 for each network of the test networks 271. The master processor 272 cooperates with each of the controllers 275, 276, 277, for operating the particular networks of the test networks 271. For example, the master processor 272 can handle the transfer of data from the connection fabric 280 and sequence events among the lower level controllers 275, 276, 277, without performing a function custom for one of the specific test networks 271. In contrast, the controllers 275, 276, 277, can focus on their corresponding test task. For chiplet 270, the master processor 272 communicates with each of the individual controllers 275, 276, 277, of each test network through the connection fabric router 274.

FIGS. 3-6F illustrate diagrams of examples of multiple chips connected together by connection fabric and controlled by hierarchically ordered test processors according to the principles of the disclosure. The multiple chips of FIGS. 3-6F can be a processor, such as a GPU or a CPU, or another type of IC. The same type of chips or different types of chips can be connected together in the multi-chip configuration of FIGS. 3-6F. For example, the multiple chips of FIGS. 3-5 can be GPUs, CPUs, or a combination of a GPU connected to a CPU. The chiplets of each of the chips in FIGS. 3-6F are not specifically denoted but are shown to provide examples of chips with different configurations of chiplets connected by connection fabrics. The chiplets can be, for example, chiplet 110 of FIG. 1 or one of the chiplets 240-270 of FIGS. 2A and 2B. Accordingly, the chiplets of FIGS. 3-6F can include functional circuitry and one or more test processors that are hierarchically coordinated with top level test processors of the chips. The connection fabrics of each of the chips of FIGS. 3-6F can be configured to operate as the connection fabrics of FIGS. 1-2B. The connection fabrics of each of the chips of FIGS. 3-6F can include one or more connection fabric routers, some which are specifically denoted, that operate as the connection fabric routers of chip 200.

Figure 3:
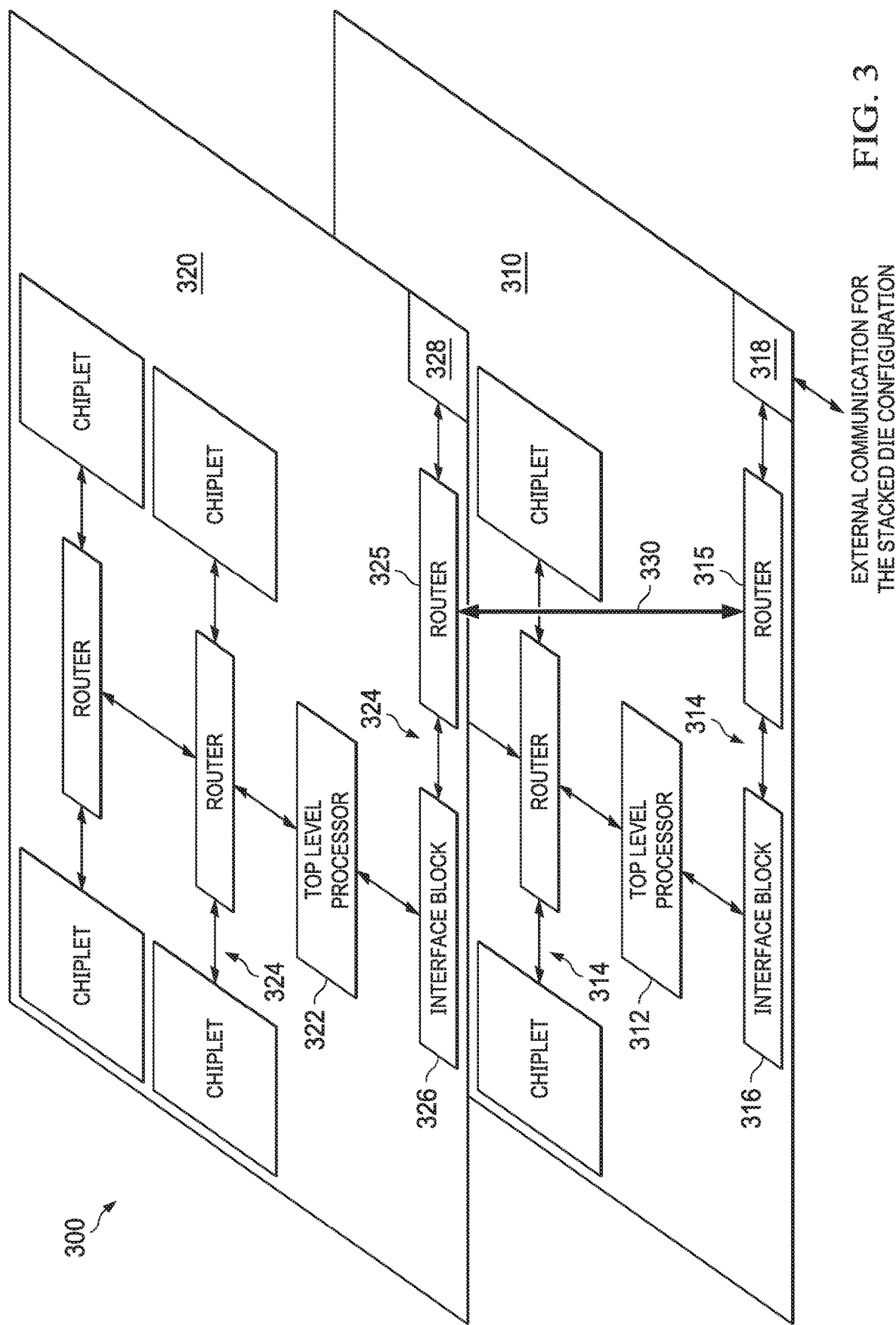
FIG. 3 illustrates a diagram of an example of a stacked die configuration where top level processors of other connected chips are made slaves to a single system master processor.
Figure 4:
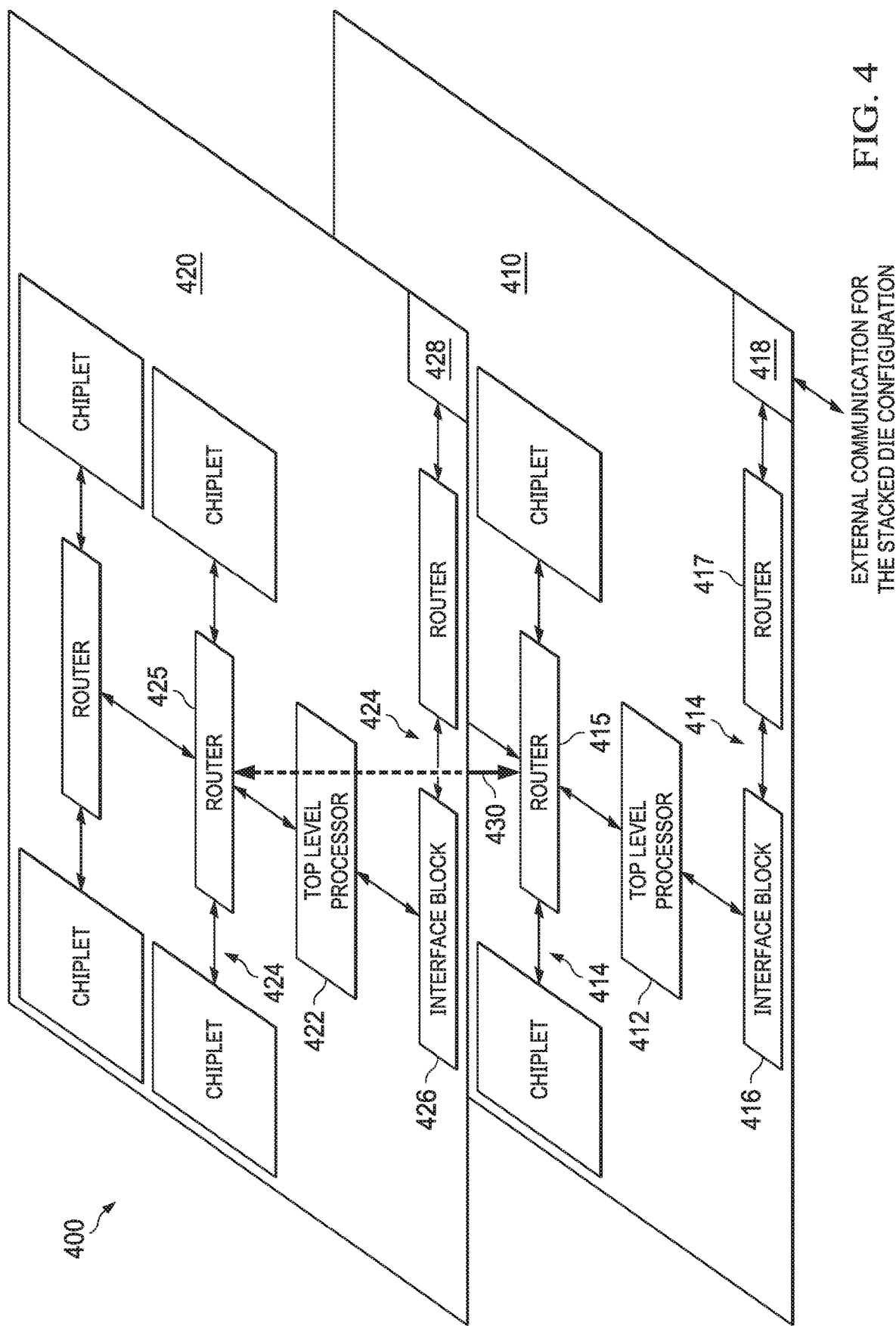
FIG. 4 illustrates another configuration of a stacked die configuration wherein top level processors of stacked chips can be bypassed and the system master processor can directly communicate to the test processor of chiplets of the other chips.

FIG. 3 and FIG. 4 show two different stacked die configurations. In stacked die configurations, a single top level processor communicates with the outside world, i.e., external of its own chip, and is referred to as the system master processor. The system master processor configures all other test processors, both on its own chip and in other chips that are connected.

FIG. 3 illustrates a diagram of an example of a stacked die configuration 300 where top level processors of other connected chips are made slaves to a single system master processor. In this configuration, the system master processor communicates with chiplets on other connected chips through the slave top level processor on the other chips.

The stacked die configuration 300 includes a first chip 310 connected to a second chip 320. The first chip 310 and the second chip 320 can be, for example, the chip 200. The first chip 310 includes a top level processor 312 that is designated the system master processor for the stacked die configuration 300. Connection fabric 314 of the first chip 310 is connected to connection fabric 324 of the second chip 320 via connection fabric routers 315 and 325 and an external connection 330 to provide communication from the system master processor 312 to the chiplets of the second chip 320 through slave top level processor 322. The external connection 330 can be a TSV that connects the first chip 310 and the second chip 320. Another type of connection method for connecting stacked dies to each other can also be used instead of TSV. Interface blocks 316 and 326 provide an interface between the system master processor 312 and the connection fabric router 315, and the slave top level processor 322 and the connection fabric router 325. The connection fabric router 315 can provide external communication for the stacked die configuration 300 via external connectors 318. Chip 320 can include external connectors 328 connected to connection fabric router 325 that are not employed for external communications, but instead rely on the external connectors 318.

Figure 5:
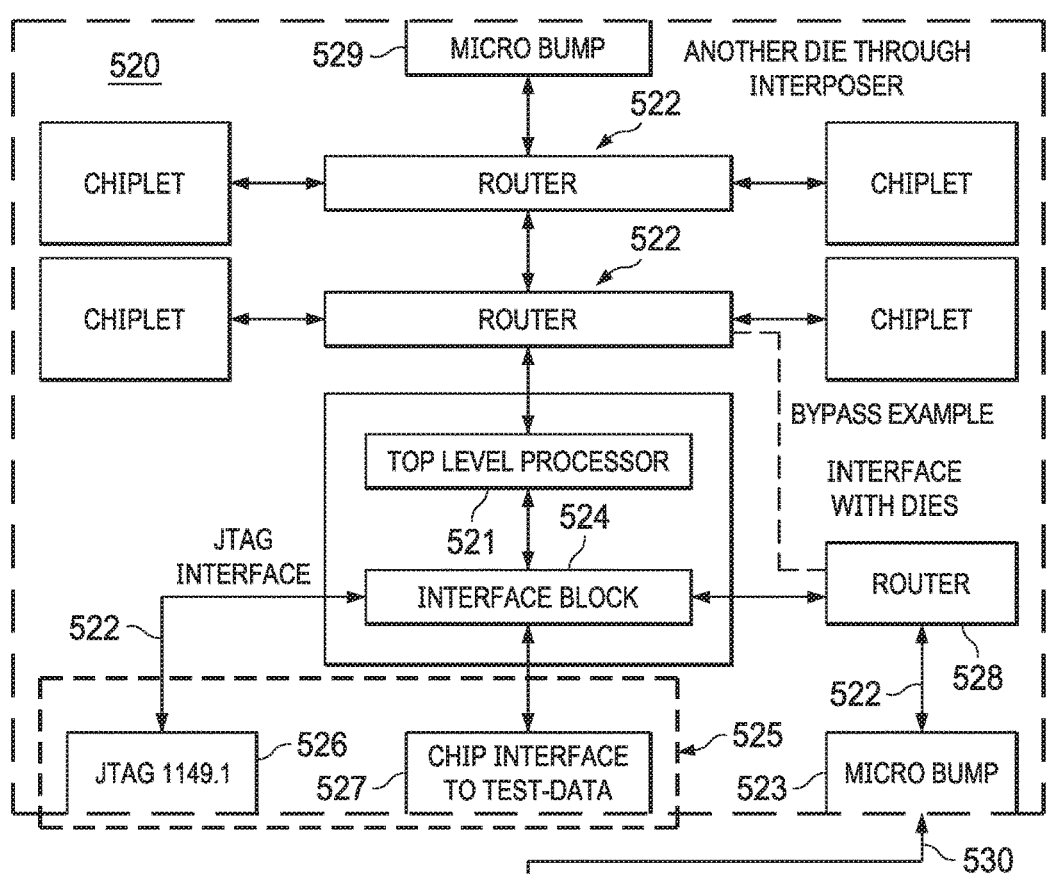
FIG. 5 illustrates a configuration of chips where a connection fabric can be extended to cover multiples-dies-on-interposer chips.
Figure 5:
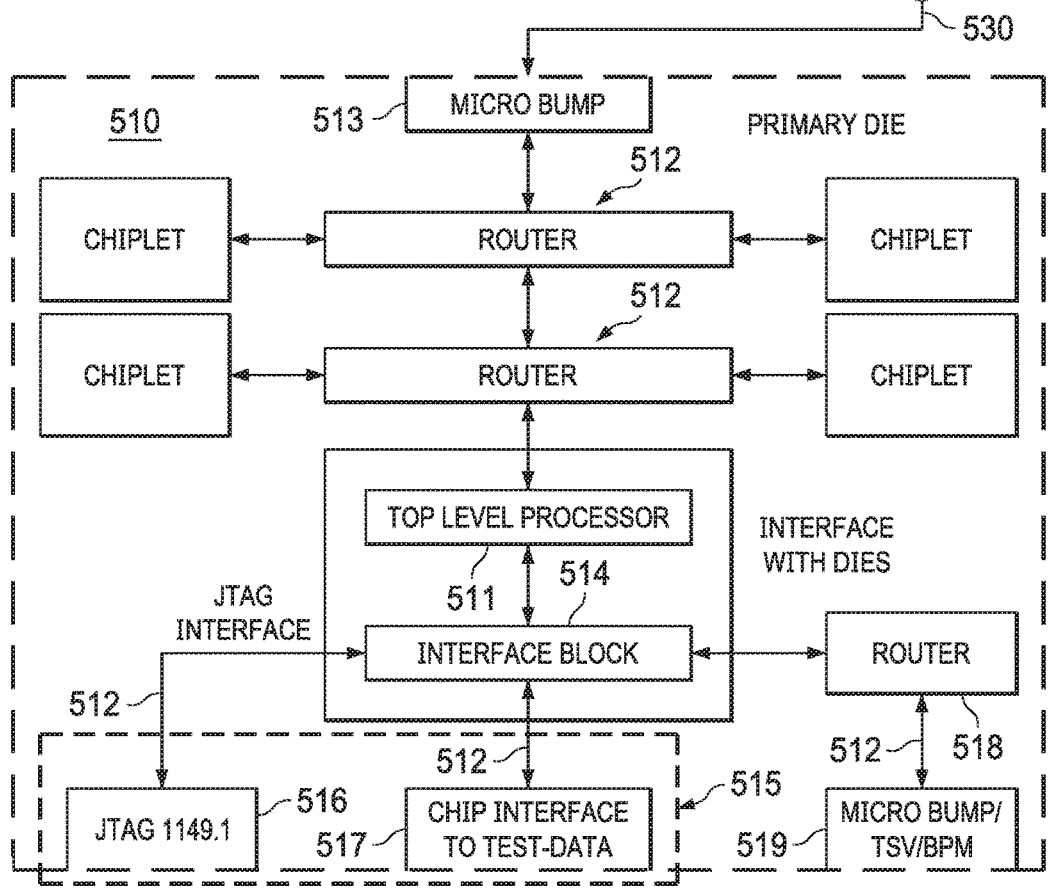
Figure 6A:
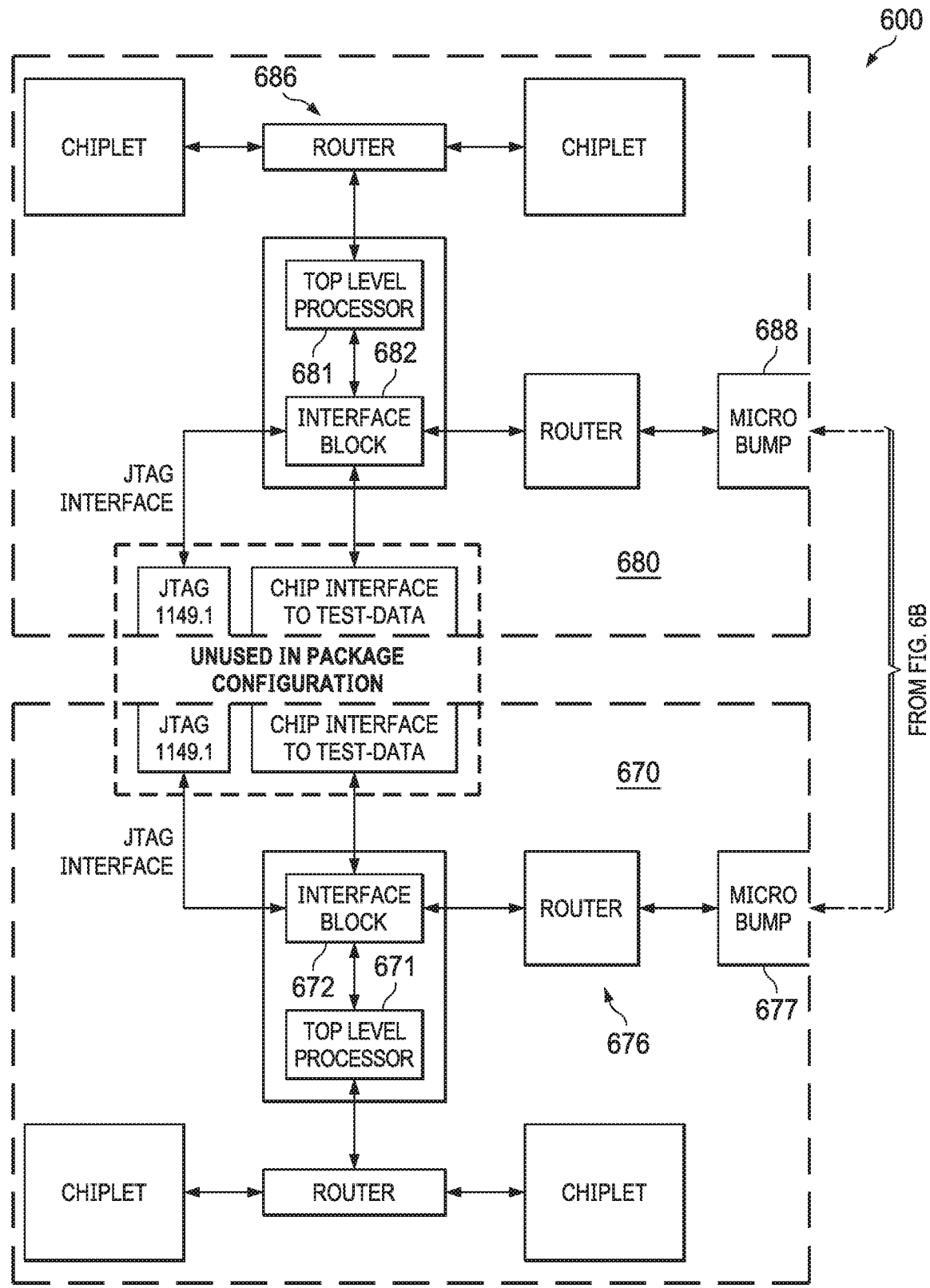
FIGS. 6A to 6F illustrate a diagram of an example of a multiple die configuration constructed according to the principles of the disclosure.
Figure 6B:
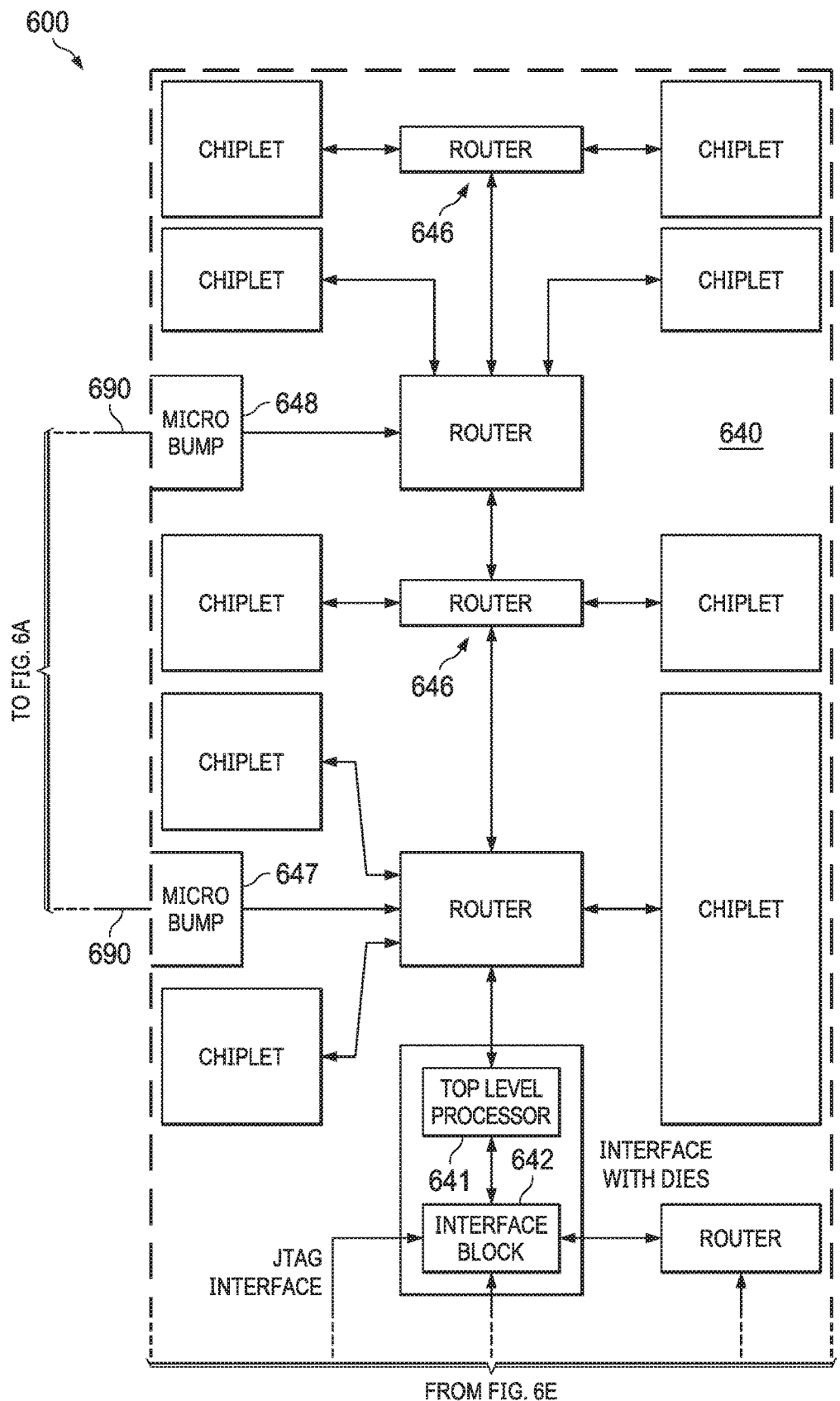
Figure 6C:
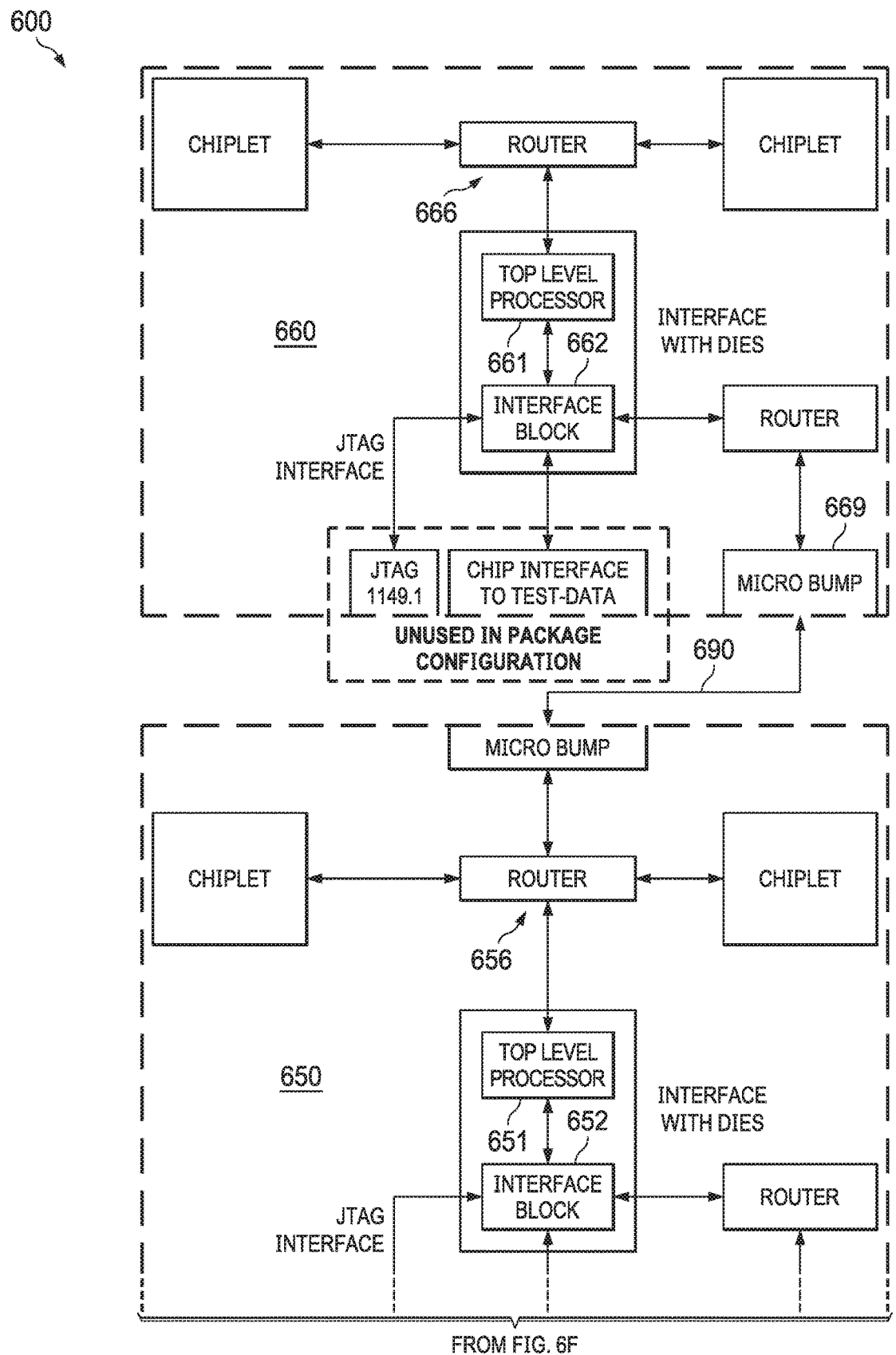
Figure 6D:
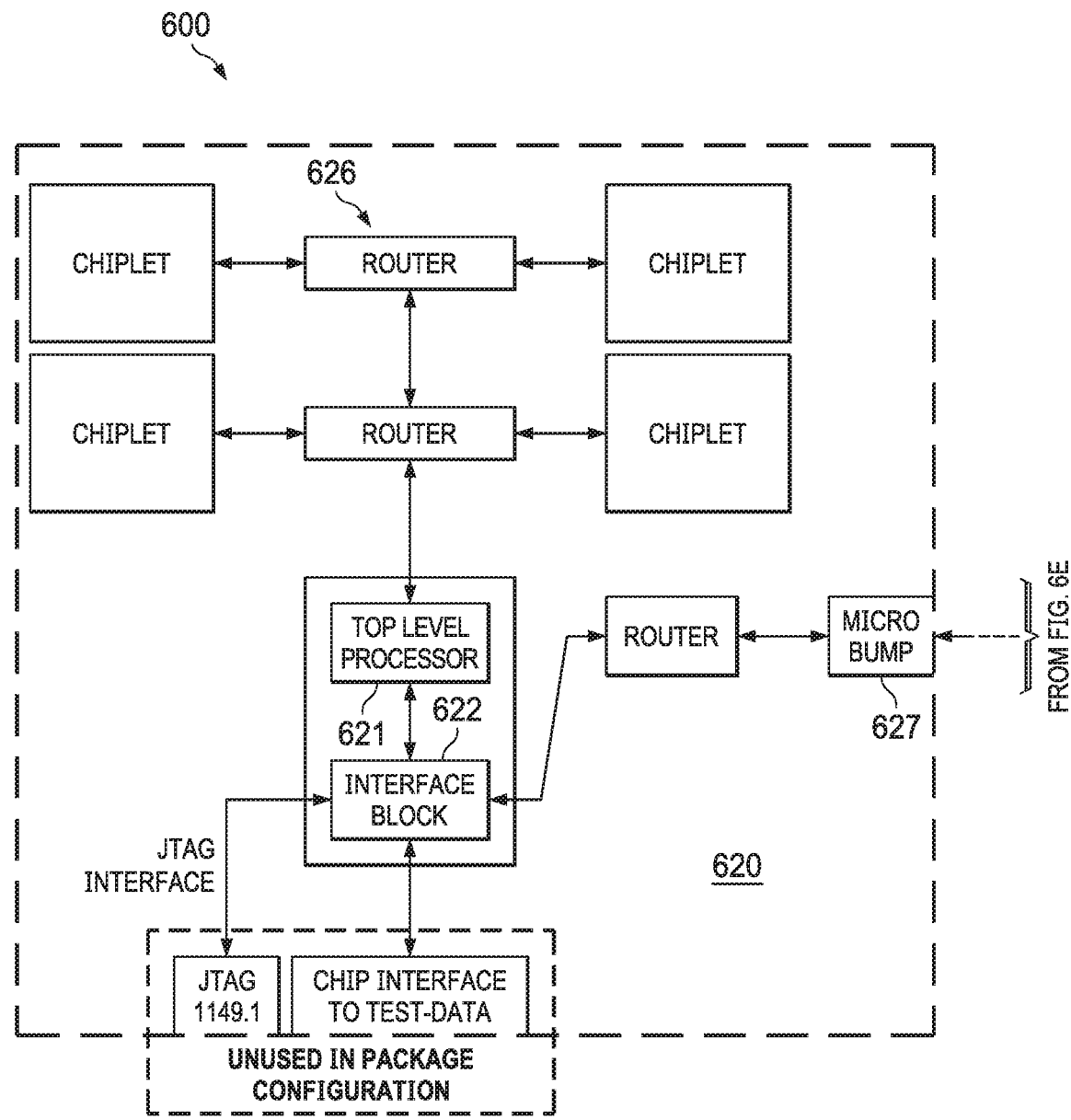
Figure 6E:
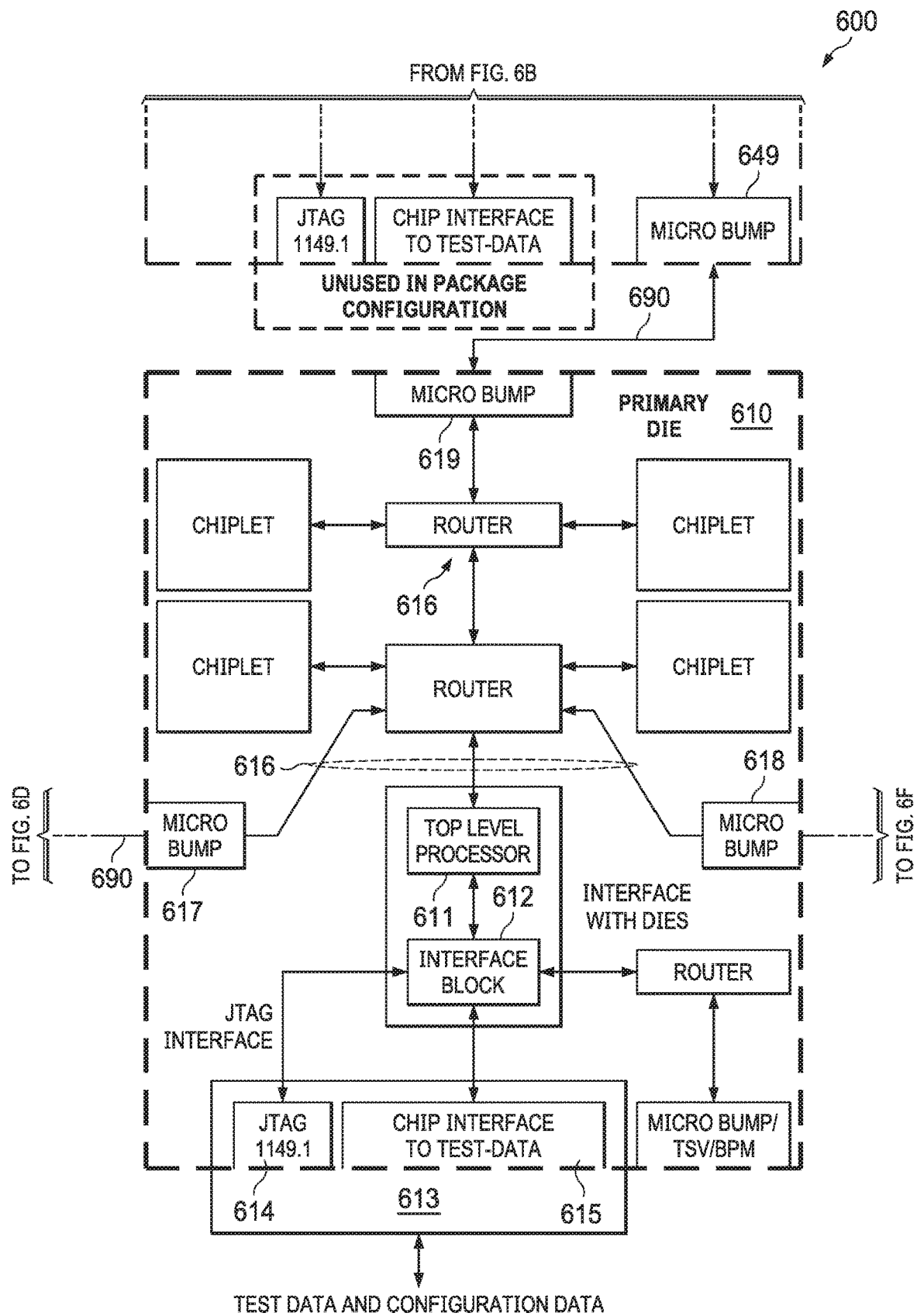
Figure 6F:
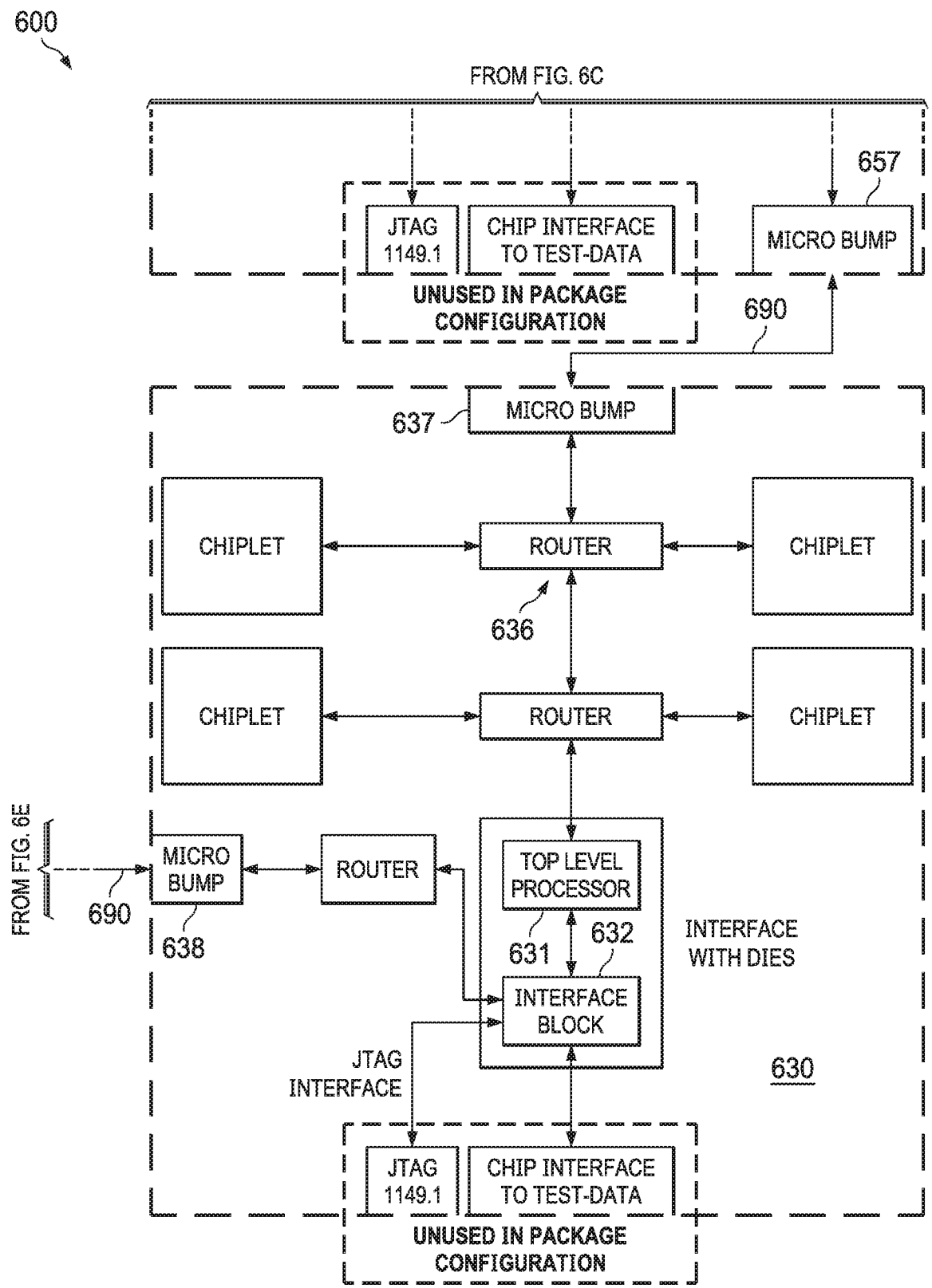

FIG. 4 illustrates another configuration of a stacked die configuration 400, wherein top level processors of other stacked chips can be bypassed and the system master processor can directly communicate to the test processor of chiplets of the other chips. Similarly, the top level processor of one or more slave chips can also be bypassed in the other configurations illustrated in FIG. 3, FIG. 5, and the multiple die configuration 600 of FIGS. 6A to 6F. As such, the system master processor can directly control all of the chiplets and routers of the slave chips in other configurations, also. FIG. 5 provides an example of such a bypass in one of the slave chips.

The stacked die configuration 400 includes a first chip 410 connected to a second chip 420. The first chip 410 and the second chip 420 can be, for example, the chip 200. The first chip 410 includes a top level processor 412 that is designated the system master processor for the stacked die configuration 400. Connection fabric 414 of the first chip 410 is connected to connection fabric 424 of the second chip 420 via connection fabric routers 415 and 425 and an external connection 430 to provide communication from the system master processor 412 to the chiplets of the second chip 420 without going through top level processor 422 of the second chip 420. The external connection 430 can be a TSV, which connects the first chip 410 and the second chip 420. As noted above, another type of connection method can be used besides TSV. Interface block 416 provides an interface between the system master processor 412 and connection fabric router 417, which can provide external communication for the stacked die configuration 400 via external connectors 418. Chip 420 can include external connectors 428 connected to the connection fabric 424 that are not employed for external communications, but instead rely on the external connectors 418. Connection fabric 424 is connected to the top level processor 422 of the second chip 420 via interface block 426. Additionally, one or more of the chips of FIG. 3 and FIG. 4 can include a die connector that may or may not be used depending on the particular configuration or application.

FIG. 5 illustrates a configuration of chips where a connection fabric can be extended to cover multiples-dies-on-interposer chips. In the example of FIG. 5, two chips are connected via an interposer. In this type of package, only one chip acts as a "primary chip" and a system master processor resides in the primary chip and communicates with the other connected chips' top level processor through the connection fabric. Each separate chip can be a stacked chip on the interposer. Communication within stacked chips follows the protocols of hierarchically ordered test processors, such that a higher ordered test processor communicates test data and configuration data to lower ordered test processors for interfacing with test networks. In an alternate configuration, the top level processor of the non-primary chips can be bypassed, and the top level processor of the primary chip can control all the routers and chiplets in the system. The dashed line between router 528 and router 522 provide an example of bypassing the top level processor. A similar bypass can be used in the other example configurations of FIG. 3 and FIGS. 6A to 6F. The bypass connection can be a conventional connection employed in integrated circuits FIG. 5 illustrates a diagram of an example of a multiple die configuration 500 constructed according to the principles of the disclosure. The multiple die configuration 500 includes a first chip 510 connected to a second chip 520 via an interposer 530. The first chip 510 and the second chip 520 can be, for example, the chip 200. The first chip 510 includes a top level processor 511 that is designated the system master processor for the multiple die configuration 500.

Connection fabric 512 of the first chip 510 is connected to connection fabric 522 of the second chip 520 via connection die connectors 513 and 523 and the interposer 530. Through the connection of the interposer 530, the system master processor 511 can communicate to the chiplets of the second chip 520 through top level processor 521 of the second chip 520. The top level processor 521 can be configured as a slave processor of the system master processor 511.

Interface block 514 provides an interface between the system master processor 511 and the external connectors 515 via the connection fabric 512. The external connectors 515 include, for example, a JTAG connector 516 and a chip interface 517. The JTAG connector 516 can be a JTAG 1149.1 compliant connector and the chip interface 517 can be general purpose input/output pins. The interface block 514 also provides a connection between the system master processor 511 and another die connector 519 via connection fabric 512 and connection fabric router 518. The external connectors 515 can provide external communication for the multiple die configuration 500 while the die connector 513 provides the inter-chip connection via the interposer 530. The die connector 519 is not connected in this example but could also be used for connecting to other chips.

On chip 520, interface block 524 provides a connection between the top level processor 521 and die connector 523 via connection fabric 522 and connection fabric router 528. Similar to chip 510, interface block 524 also provides an interface between the top level processor 521 and the external connectors 525, which includes a JTAG connector 526 and a chip interface 527, via the connection fabric 522. In this example configuration, the external connectors 525 are not needed for external communication. Instead, the external connectors 515 are employed for the multiple die configuration 500. Chip 520 also includes another die connector 529 is not connected in this example but could also be used for connecting to another chip. FIGS. 6A to 6F show another example of a multiple-die-on-interposer package configuration having more than two chips connected together via an interposer.

FIGS. 6A to 6F illustrate a diagram of an example of a multiple die configuration 600 constructed according to the principles of the disclosure. The multiple die configuration 600 includes eight chips that are interconnected via an interposer 690. As with the multiple die configuration 500, a single chip is designated as a "primary chip" with a system master processor that communicates with the top level processor of the other connected chips' through connection fabrics and the interposer 690. The top level processors of the connected chips can be configured as slave processors of the system master processor. Alternatively, one or more of the top level processors of the connected chips can be bypassed such as shown in FIG. 5. As such, the system master processor can control the routers and chiplets of the multiple die configuration 600. Communication within the stacked chips follows the protocols of hierarchically ordered processors, such that a higher ordered test processor communicates test data and configuration data to lower ordered test processors for interfacing with test networks.

The eight chips of the multiple die configuration 600 are individually designated as chips 610, 620, 630, 640, 650, 660, 670, and 680, and are collectively referred to by chip numbers, such as chips 610-680 when referring to all of the chips. Each of the chips 610-680 includes two or more chiplets, a connection fabric with connection fabric routers, an interface block, at least one die connector, external connectors, and a top level processor. Each of these components of the chips 610-680 can be or can operate as one of the same components described herein, such as in FIGS. 1-5. For example, each chiplet shown in FIGS. 6A to 6F includes functional circuitry and at least one test network such as shown in FIGS. 1-2B. For visual clarity, the functional circuitry and test networks of the chiplets are not shown in FIGS. 6A-6F and each of the components of chips 610-680, such as routers and chiplets, are not denoted with an element number. For chips 610-680, top level processors, interface blocks, connection fabrics, and die connectors are denoted. In addition, external connectors are denoted for chip 610.

Chip 610 is the primary chip with top level processor 611 that is designated the system master processor for the multiple die configuration 600. Chip 610 includes an interface block 612 that provides an interface between the system master processor 611 and external connectors 613 via connection fabric 616. The external connectors 613 can provide external communication for each of the chips 610-680 of the multiple die configuration 600 through the various connection fabrics and interposer connections. The test data and configuration data for each of the test networks integrated in the chiplets of chips 610-680 are received via the external connectors 613 and distributed to the designated test networks. As such, even though chips 620-680 include external connectors represented by the dashed boxes in FIGS. 6A to 6F, these external connectors are not needed in the multiple die configuration 600. The external connectors 613 include a JTAG connector 614 and a chip interface 615 for receiving the test data and configuration data for the various test networks.

The system master processor 611 distributes the test data and configuration data to the test networks of chip 610's chiplets via the connection fabric 616. The system master processor 611 is also connected to the top level processors of the chips 620-680 via the connection fabrics of the chips 610-680 and the interposer connections for communicating with each of the test networks of chips 620-680's chiplets. The primary chip 610 is not directly connected to each of the other chips 620-680 but can communicate with some of the chips 620-680 via other chips. As shown, connection fabric 616 of the primary chip 610 is connected to connection fabrics 626, 636, 646, of chips 620-640 via die connectors 617, 618, and 619 of primary chip 610, and die connectors 627, 638, and 649 of chips 620-640. Primary chip 610 includes an additional die connector coupled to the interface block 612 that is not needed in multiple die configuration 600 and is not denoted.

Top level processor 621 of chip 620 is connected to each of the chiplets via the connection fabric 626 and to the die connector 627 via the connection fabric 626 and interface block 622. For chip 630, top level processor 631 is connected to each of the chiplets via the connection fabric 636 and to the die connector 638 via the connection fabric 636 and interface block 632. Similarly, top level processor 641 of chip 640 is connected to each of the chiplets via the connection fabric 646 and to the die connector 649 via the connection fabric 646 and interface block 642.

Chip 640 includes two additional die connectors 647 and 648 that connect chip 640 to chip 670 and to chip 680 via interposer connections and die connectors 677 and 688. The connection fabric 646 is connected to connection fabric 676 of chip 670 through the die connectors 647 and 677. Top level processor 671 is connected to the die connector 677 via interface block 672 and the connection fabric 676. Similarly, top level processor 681 is connected to the die connector 688 via interface block 682 and the connection fabric 686. As such, the top level processor 641 is connected to top level processor 671 and top level processor 681 for distribution of test data and/or configuration data to the chiplets of chips 670 and 680 via the connection fabrics 676 and 686.

Chips 650 and 660 are connected to primary chip 610 via chip 630. Connection fabric 636 is connected to die connector 637 which is connected to die connector 657 of chip 650 via interposer 690. Top level processor 651 is connected to the die connector 657 via interface block 652 and connection fabric 656. The top level processor 651 is also connected to die connector 659 via the connection fabric 656. Via the interposer 690, die connector 659 is connected to die connector 669 of chip 660. Top level processor 661 of chip 660 is connected to the die connector 669 via interface block 662 and the connection fabric 666. As such, the top level processor 631 of chip 630 is connected to top level processor 651 and top level processor 661 for distribution of test data and/or configuration data to the chiplets of chips 650 and 660 via connection fabrics 656 and 666.

Figure 7:
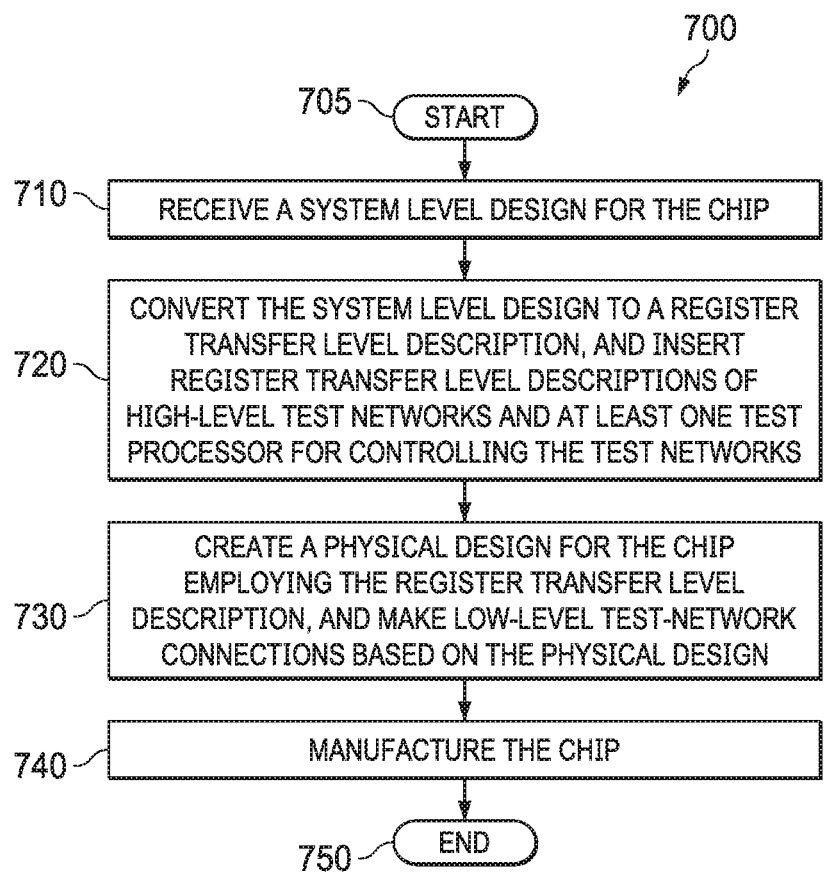
FIG. 7 illustrates a flow diagram of an example of a method of designing and manufacturing a chip carried out according to the principles of the disclosure.

FIG. 7 illustrates a flow diagram of an example of a method 700 of designing and manufacturing a chip carried out according to the principles of the disclosure. The chip can have hierarchically ordered test processors for communicating test data and configuration data to test networks. The test processors/structures are added as part of register transfer level (RTL) work and synthesized together with the rest of the chip to create a physical design. The chip can be, for example, one of the chips of FIGS. 1-6F. One or more of the steps of the method 700 can be performed by a computer. The method 700 begins in step 705.

In step 710, a system level design for the chip is received. The system level design provides the functional requirements for the chip and can include an instruction set. The instruction set can define the functionality of chiplets of the chip. The instruction set, or portions of the instruction set, can be created by modifying existing instruction sets.

The system level design is converted to a register transfer level (RTL) description in step 720. Additionally, RTL descriptions of high-level test networks and at least one test processor for controlling the test networks are inserted in step 720. Depending on how the RTL hierarchy is defined, the high-level test networks can be part of the chiplets. More than one test processor can be used and can be hierarchically ordered. In some examples, the one or more test processor can be used with one or more custom controllers of the test networks. The test networks can be inserted in a chiplet or chiplets of the chip and can be, for example, one or more of a scan network, a LBIST network, a MBIST network, or a JTAG network. The test networks can be used for structural tests, diagnosis tests, and/or system debug testing. In some examples, one or more of the test networks can also be used for configuring a test circuit, silicon characterization of the chiplet, and for configuring the functional logic of the chiplet.

In step 730, a physical design for the chip is created employing the RTL description that includes the test networks and the at least one test processor. Creating the physical design can include the typical steps of floor planning, placement, clock tree synthesis, etc. Essentially, the behavioral model of the functionality of the chip provided by the RTL description is used to create the physical design by mapping the RTL description, including the test networks, into representations of the electronic devices, such as capacitors, resistors, logic gates, and transistors, which will be used on the chip. Low-level test-network connections based on the physical design are also made. For example, the connections between flip-flops to form a chain of flip-flops for scan test purposes can be made in step 730 since physical data about the flip-flops is available. The physical design can then be checked, e.g., verification, and moved to tapeout.

In step 740, the chip is manufactured. The chip, or chips, can be manufactured based on a verified physical design. Conventional manufacturing procedures can be used to produce the chip(s). The manufactured chips can be used in safety critical circuits, such as used in autonomous machines. Autonomous machines include, for example, autonomous vehicles (automobiles, trucks, flying machines, etc.) and robots. The manufactured chips can also be used in data centers and can be used to provide different cloud services, such as game streaming. For example, one or more chiplets of a manufactured chip can be a GPU configured to perform graphic computations for game streaming. A manufactured chip can be part of a multi-chip processing system, such as a system on a chip (SoC) or a multi-chip module. The method 700 continues to step 750 and ends.

The disclosure provides test processors to replace DFX blocks, and by doing that, unifies the primary DFX unit as the test processor. The same type of test processor can be used for all tasks, and each one can be programmed to do a different task. Employing the test processors can save engineering effort in design and verification. Accordingly, the test processors provide a more flexible solution compared to the existing DFX blocks that are used. With DFX blocks, late design changes can cause schedule delays, and any design change after tape-out is limited to metal fixes. Anything beyond that is not possible once the chip is manufactured. In contrast, the disclosure provides a highly flexible solution since programming of the test processors can be changed at any time; even after manufacturing, and can support practically an unlimited number of core chips in any configuration. The high flexibility provided by the disclosure can reduce engineering effort needed in design and verification, accelerate schedules, and may prevent additional tapeouts in case of DFX design bugs. By making debug and diagnosis easier by providing an opportunity to change debug behavior as needed, the time-to-market timeline can be accelerated.

A portion of the above-described apparatus, systems or methods may be embodied in or performed by various digital data processors or computers, wherein the computers are programmed or store executable programs of sequences of software instructions to perform one or more of the steps of the methods, such as one or more steps of the method 700. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured means, for example, designed, constructed, or programmed, with the necessary logic and/or features for performing a task or tasks. The GPUs and/or CPUs may be include the test processors according to the principles of the disclosure.

Various aspects of the disclosure can be claimed including the systems and methods as noted in the summary. Each of the aspects noted in the summary may have one or more of the elements of the dependent claims presented below in combination.

Those skilled in the art to which this application relates will appreciate that other and further additions, deletions, substitutions and modifications may be made to the described embodiments.

What is claimed is:
1. A chip, comprising:
a chiplet including at least one test network;
at least one external connector; and
a test processor connected to and positioned between the at least one test network and the at least one external connector, wherein the test processor is configured to control the at least one test network for testing of the chiplet.
2. The chip as recited in claim 1, further comprising an interface block configured to receive and provide test data and configuration data to the test processor for controlling the at least one test network for the testing.

3. The chip as recited in claim 2, the at least one external connector is configured to receive the test data and configuration data from an external source and provide the test data and configuration data to the interface block.

4. The chip as recited in claim 3, wherein the at least one external connector is a high speed link interconnect, a memory pin, or a chip connector.

5. The chip as recited in claim 3, wherein the processor is connected to the at least one test network via a high speed link.

6. The chip as recited in claim 1, wherein the chiplet includes multiple test networks and the test processor is configured to control each of the multiple test networks to test the chiplet.

7. The chip as recited in claim 1, wherein the chiplet further includes a custom controller for the at least one test network and the test processor is configured to control the at least one test network for the testing via the custom controller.

8. The chip as recited in claim 1, wherein the test processor is a master processor for the chiplet.

9. The chip as recited in claim 8, wherein the chip further includes a top level processor that directs test data and configuration data to the at least one test network via the master processor.

10. The chip as recited in claim 9, wherein the chiplet is a first chiplet and the chip includes a second chiplet having at least one testing network and the top level processor is configured to control the at least one testing network for testing of the second chiplet.

11. The chip as recited in claim 10, wherein the master processor is a first master processor and the second chiplet further includes a second master processor, and the top level processor is configured to control the at least one testing network via the second master processor.

12. The chip as recited in claim 1, wherein the processor is a top level processor for the chip.

13. A multi-chip processing system, comprising:
a first chip including at least one external connector, a first chiplet having at least one test network, a first connection fabric, and a first processor configured to control the at least one test network for testing of the first chiplet, wherein the first processor is connected to the at least one test network via the first connection fabric and is positioned between the at least one external connector and the at least one test network; and
a second chip including a second chiplet having at least one testing network, a second connection fabric, and a second processor configured to control the at least one testing network for testing of the second chiplet, wherein the second processor is connected to the at least one testing network via the second connection fabric, and the first and second chips are connected via the first and second connection fabrics.

14. The multi-chip processing system as recited in claim 13, wherein the first processor is a system master processor for the multi-chip processing system that configures the second processor for controlling the at least one testing network.

15. The multi-chip processing system as recited in claim 14, wherein the second processor is a master processor for the second chiplet.

16. The multi-chip processing system as recited in claim 14, wherein the system master processor receives test data and configuration data via an interface block connected to the at least one external connector of the first chip, and the first and second connection fabrics are high speed links that each include at least one router.

17. The multi-chip processing system as recited in claim 13, wherein the multi-chip processing system is a stacked die configuration.

18. The multi-chip processing system as recited in claim 13, wherein the first and second fabrics are connected together via an interposer.

19. A method of designing a chip, comprising:
receiving a system level design for the chip, wherein the chip includes at least one external connector;
converting the system level design to a register transfer level description and inserting therein a register transfer level description of test networks and at least one test processor that is programmable for interfacing and controlling the test networks; and
creating a physical design for the chip employing the register transfer level description that includes the test networks and the at least one test processor, wherein the at least one test processor is positioned between the at least one external connector and the test networks.

20. The method as recited in claim 19, wherein the creating includes making low-level test-network connections based on the physical design.

21. A graphics processing unit (GPU) chip; comprising:
a plurality of chiplets, wherein one or more of the plurality of chiplets includes at least one test network and two or more of the plurality of chiplets are configured to perform graphics computations; and
a hierarchy of test processors connected to and configured to control the at least one test network for testing of the plurality of chiplets, wherein the hierarchy of test processors are positioned between the at least one test network and an external connector of the GPU chip.

22. The GPU chip as recited in claim 21, wherein the hierarchy of test processors includes a top level processor configured to direct test data and configuration data to the at least one test network of the plurality of chiplets.

23. The GPU chip as recited in claim 22, wherein the hierarchy of test processors further includes a master processor of one or more of the plurality of chiplets.

24. The GPU chip as recited in claim 21, wherein one or more of the plurality of chiplets include multiple test networks and the hierarchy of test processors directs test data and configuration data to the multiple test networks of the plurality of chiplets.

25. A system on a chip (SoC); comprising:
at least one graphics processing unit (GPU) chip including a first external connector, a first plurality of chiplets that each have at least one test networks, a first connection fabric, and a first processor configured to control each of the at least one test networks for testing a respective one of the first plurality of chiplets, wherein the first processor is connected to each of the at least one test networks via the first connection fabric and is positioned between the first external connector and each of the at least one test networks; and
at least one central processing unit (CPU) chip including a second plurality of chiplets that each have at least one testing networks, a second connection fabric, and a second processor configured to control each of the at least one testing networks for testing a respective one of the second plurality of chiplets, wherein the second processor is connected to each of the at least one testing networks via the second connection fabric.

26. The SoC as recited in claim 25, wherein the CPU chip includes a second external connector, and the first and second connection fabrics are connected via the first and second external connectors.

27. The SoC as recited in claim 25, wherein one or more of the first plurality of chiplets and one or more of the second plurality of chiplets further include a master processor, wherein the first processor, the second processor, and the master processor are hierarchically ordered.

* * * * *

UNITED STATES PATENT AND TRADEMARK OFFICE
CERTIFICATE OF CORRECTION

PATENT NO. : 11,526,644 B2
APPLICATION NO. : 17/089864
DATED : December 13, 2022
INVENTOR(S) : Kaushik Narayanun et al.

Page 1 of 1

It is certified that error appears in the above-identified patent and that said Letters Patent is hereby corrected as shown below:

In the Specification

In Column 1, Line 24, delete "(DET)" and insert --(DFT)--

Signed and Sealed this
Nineteenth Day of December, 2023

Katherine Kelly Vidal
*Director of the United States Patent and Trademark Office*